United States Patent
Jung et al.

(10) Patent No.: US 7,171,520 B2
(45) Date of Patent: Jan. 30, 2007

(54) CACHE FLUSH SYSTEM AND METHOD THEREOF

(75) Inventors: Sang Ik Jung, Suwon-si (KR); Seok Jin Yoon, Seongnam-si (KR)

(73) Assignee: LG/Nortel Co., Ltd., Seoul (KR)

( * ) Notice: Subject to any disclaimer, the term of this patent is extended or adjusted under 35 U.S.C. 154(b) by 255 days.

(21) Appl. No.: 10/731,019

(22) Filed: Dec. 10, 2003

(65) Prior Publication Data

US 2004/0123040 A1 Jun. 24, 2004

(30) Foreign Application Priority Data

Dec. 24, 2002 (KR) .................. 10-2002-0083582

(51) Int. Cl.
*G06F 12/12* (2006.01)

(52) U.S. Cl. .................. 711/135; 711/144; 711/146; 711/133; 707/3

(58) Field of Classification Search .................. 711/135
See application file for complete search history.

(56) References Cited

U.S. PATENT DOCUMENTS

| 5,835,949 | A * | 11/1998 | Quattromani et al. | ........ 711/135 |
| 6,230,151 | B1* | 5/2001 | Agrawal et al. | ............... 706/12 |
| 6,418,515 | B1* | 7/2002 | Kurosawa | .................... 711/135 |
| 6,976,128 | B1* | 12/2005 | Williams et al. | ............ 711/135 |
| 2003/0009631 | A1* | 1/2003 | Arimilli et al. | ............. 711/135 |
| 2004/0133562 | A1* | 7/2004 | Toong et al. | .................. 707/3 |

* cited by examiner

*Primary Examiner*—B. James Peikari
(74) *Attorney, Agent, or Firm*—Fleshner & Kim LLP.

(57) ABSTRACT

The present invention relates to a cache flush system and the method for a cache flush performed in cache memory against at least one corresponding prescribed event in a multi-processor system. Embodiments of the present invention can reduce or minimize loads of a processor bus by performing memory read of at most a prescribed size and can increase simultaneousness of cache flush against a corresponding prescribed event by performing a cache flush directly triggered by the prescribed event thereby enabling high speed and automated cache flush algorithm.

7 Claims, 13 Drawing Sheets

CACHE FLUSH SYSTEM AND METHOD THEREOF

BACKGROUND OF THE INVENTION

1. Field of the Invention

The present invention relates to a cache, flush system and a method thereof.

2. Background of the Related Art

In a general processor system, in order to speed up a processor's access to a main memory, a cache memory temporarily stores data necessary for the processor. Generally, a cache memory maintains management information called a "cache tag" to manage whether data stored in cache block of the cache memory is data among data in the main memory, whether the data stored in the cache block of the cache memory is changed and is in a state having contents that are different from contents of data in the main memory (i.e., modified state or dirty state).

In a multi-processor system including a plurality of processors, a plurality of cache memories exist and each cache memory has a snoop mechanism in order to assure memory coherency or data coherency. The snoop mechanism checks whether processor bus instruction affects data stored in each cache memory, whether the data stored in each cache memory should be returned, etc. and makes corresponding data invalid.

Cache memory includes copy back type and write through type. For the copy back type cache memory, which maintains data during certain period without instantly reflecting data renewal by a processor in a main memory, it is needed to actively write back data changed by a processor, whose contents became different from contents of the main memory, in the main memory. For example, when data stored in cache memory is transmitted to an input/output device not having a snoop mechanism, it is necessary to write back. A cache flush algorithm is used to write data, whose contents are changed among data stored in a main memory, again in the main memory. Further, a cache block in a dirty state is called a dirty block.

The cache flush algorithm is useful for a fault tolerant or replicant system as well as for data transmission to an input/output device not having snoop mechanism. In other words, in case of a check point system that restarts process from the previously obtained check point when one of prescribed system failures occurs, it is needed to write data changed and stored only in cache memory, again in the main memory.

Generally, the cache flush algorithm is performed on the basis of software including cache flush instruction. A processor uses the software to determine whether a cache block is a dirty block referring to contents of a cache tag. If the cache block is a dirty block, the cache flush algorithm that writes data of the corresponding cache block in main memory is performed again.

As discussed above, a processor should perform cache flush algorithm, that is, re-record data in main memory, when a state of cache block is dirty as a result of checking states of all cache blocks. A prescribed amount of time is needed to check states of all cache blocks.

A multi-processor system of the related art will be described with reference to FIG. 1. As shown in FIG. 1, the related art multi-processor system includes a plurality of processors (CPU, Central Processing Unit) 5 connected to a processor bus, a plurality of cache memories 1 connected to each processor, a memory controller 2 connected to the processor bus, a main memory 3 under control of the memory controller 2, and other system resources 4 connected to the processor bus. Each of the processors includes cache memory 1 in one back side of an inside processor and an outside processor or in both back sides. Cache memory of an inside processor is called level 1 cache memory and cache memory of an outside processor is called level 2 cache memory.

Each of the processors 5 is connected to each other through a common processor bus and is able to get an access to the main memory 3 through the processor bus for instruction fetch and loading/storing data. The access to main memory 3 is generally achieved through the memory control unit 2.

The related art multi-processor system is connected to the other system resources 4 such as an input/output device as well as the above-described basic resources, in order to perform specific assigned functions. If 32 bit address and a 64 bit data bus is provided, all devices such as the processor 5, the memory controller 2 and the other system resources 4 should have same standard interface as that of the processor bus. Further, the cache memory 1 of each processor 5 has a configuration based on the standard interface.

Each of the processors 5 has 32 kilobytes (KB) level 1 instruction cache memory and 32 KB level 1 data cache memory inside and a 1 megabyte (MB) level 2 cache memory in back side outside.

An exemplary structure of a level 1 data cache memory will be described with reference to FIG. 2. The level 1 data cache memory includes tag RAM (Random Access Memory) and Data RAM. The level 1 data cache memory implements 8-way set-associative mapping. Each of the 8 cache blocks includes 4 words (W0~W3, respectively 64 bits) and address tag (20 bits) corresponding to the 4 words. Further, each cache block has 3 state information bits for indicating state of each of the cache blocks, that is, valid state bit, modified state bit and shared state bit.

Further, the level 1 instruction cache memory has the same configuration as that of the level 1 data cache memory. However, the level 1 instruction cache memory has only a valid state bit as a state information bit. Further, the level 2 cache memory stores data and instructions in data RAM and adopts direct mapping In the related art, in order to increase efficiency of cache, the level 1 cache memory and the level 2 cache memory adopts write back type as write policy. However, problems relevant to memory coherence between processors and between a processor and an input/output device can be caused because of the write policy. To manage this, a cache controller unit of each processor 5 uses modified/exclusive/ shared/invalid (MESI) protocol. FIG. 3 illustrates a MESI protocol.

As illustrated in FIG. 3, a state of the MESI protocol includes a modified state, an exclusive state, a shared state and an invalid state, and the state may be expressed by combining state information bits of each cache block. The modified state, the exclusive state and the shared state are examples of a valid state. Cache flush algorithm is performed especially in the modified state and the exclusive state among valid states.

For example, state information bits of the invalid state are as follows: the valid state bit (V) is 0; the modified state bit (M) is 0; and the shared state bit (S) is 0. State information bits of the modified state are as follows: the valid state bit (V) is 1; the modified state bit (M) is 1; and the shared state bit (S) is 0. State information bits of the shared state are as follows: the valid stated bit (V) is 1; the modified state bit (M) is 0; and the shared state bit (S) is 1. State information bits of the exclusive state are as follows: the valid state bit (V) is 1; the modified state bit (M) is 0; and the shared state bit (S) is 0.

Cache memory 1 that has been separately managed by each processor according to the MESI protocol maintains memory coherency by performing a cache flush algorithm that writes a cache block in the modified state (i.e., the dirty state) in the main memory again when a certain event of multi-processor system occurs. The procedure is if the certain event happens, each of the processors 5 performs an exception routine associated with the certain event. The cache flush algorithm is performed at an appropriate moment in the middle of the exception routine. By loading a continuous memory area amounting to two times of level 2 cache memory size, the cache flush algorithm is performed for modified cache block of level 1 data cache memory and level 2 cache memory.

An event that needs cache flush is generally emergent and therefore the process of the event needs prompt attention. However, because all processors connected to the processor bus perform memory reads as large as the level 2 cache memory size at the same time, loads of processor bus increase unnecessarily. Further, practical cache flush algorithm is performed within a time period after the certain events happen because the cache flush algorithm is performed by an exception routine of each processor. Thus, there can be a problem in that cache flush algorithm cannot be performed promptly.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

SUMMARY OF THE INVENTION

An object of the invention is to solve at least the above problems and/or disadvantages and to provide at least the advantages described hereinafter.

Another object of the present invention is to provide a multi-processor system and methods thereof that reduce or minimize loads of a processor bus.

Another object of the present invention is to provide a multi-processor system and methods thereof that provide a high speed and automated cache flush operation in response to an event in a multi-processor system.

Another object of the present invention is to provide a multi-processor system and methods thereof that reduce or minimize loads of a processor bus by performing a bounded memory read (e.g., at most level 2 cache memory size) of each processor.

Another object of the present invention is to provide simultaneousness of cache flush against a certain event by directly triggering a cache flush process using the certain event.

In order to achieve at least the above objects, in whole or in parts, there is provided a cache flush system including a valid array unit configured to provide cache block information for an update algorithm and index information for a cache flush algorithm of at least one cache block in a prescribed state, a storage unit configured to store tags and provide match address information for the update algorithm and tag information for the cache flush algorithm, a bus snooper configured to perform the update algorithm for the tag storage unit and the valid array unit by monitoring a processor bus and by tracing a state of each cache memory and a cache flush unit configured to detect a system event, to perform the cache flush algorithm for corresponding cache blocks in the prescribed state.

To further achieve at least the above objects, in whole or in parts, there is provided a cache flush method including updating status information by monitoring a transaction of a processor bus and tracing states of cache memory corresponding to each processor and flushing at least one cache block in a prescribed state among the cache blocks by detecting a prescribed event, generating a read transaction using the status information and outputting the generated read transaction.

To further achieve at least the above objects, in whole or in parts, there is provided A multi processor system that includes a plurality of processors coupled to a processor bus, at least one cache memory coupled to each processor, a memory controller coupled to the processor bus and a cache flush system coupled to the processor bus, wherein the cache flush system including a first unit configured to provide cache status information, a second unit coupled to the first unit and configured to update the cache status information and a third unit coupled to the first unit and configured to detect system events to perform cache flushing for corresponding cache blocks in a prescribed state responsive to the detected event.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
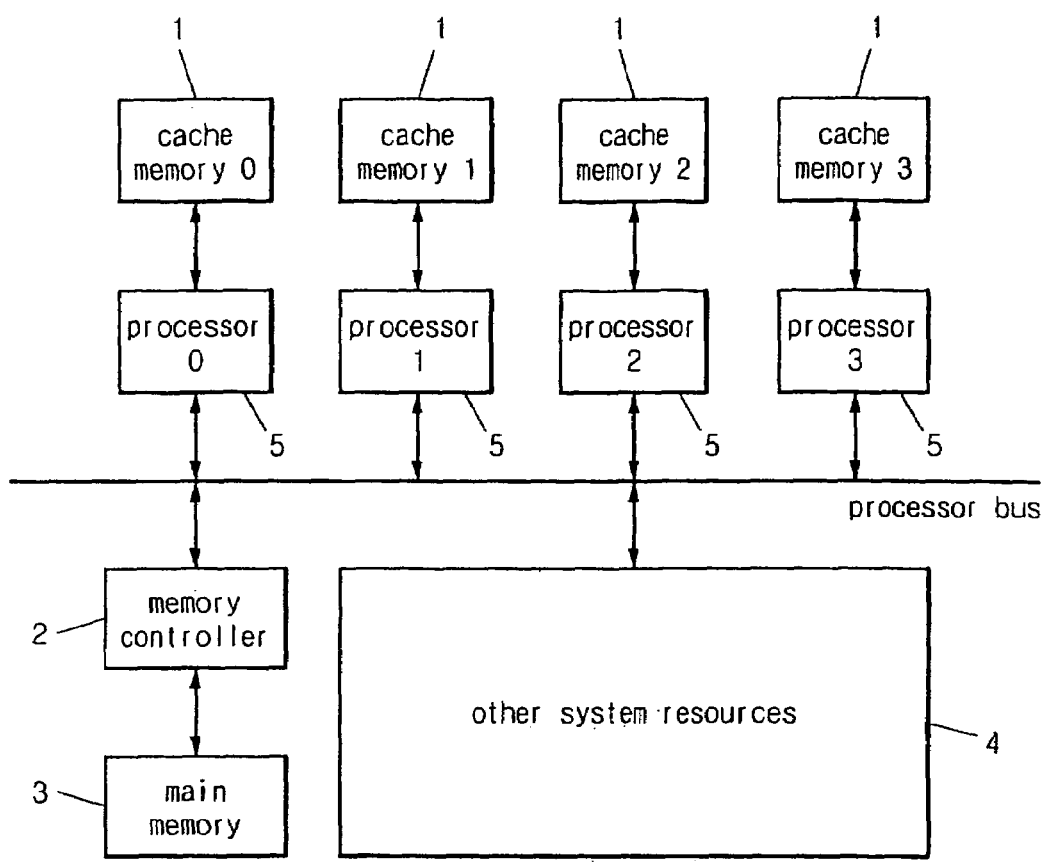
FIG. 1 illustrates a related art multi-processor system.
Figure 2:
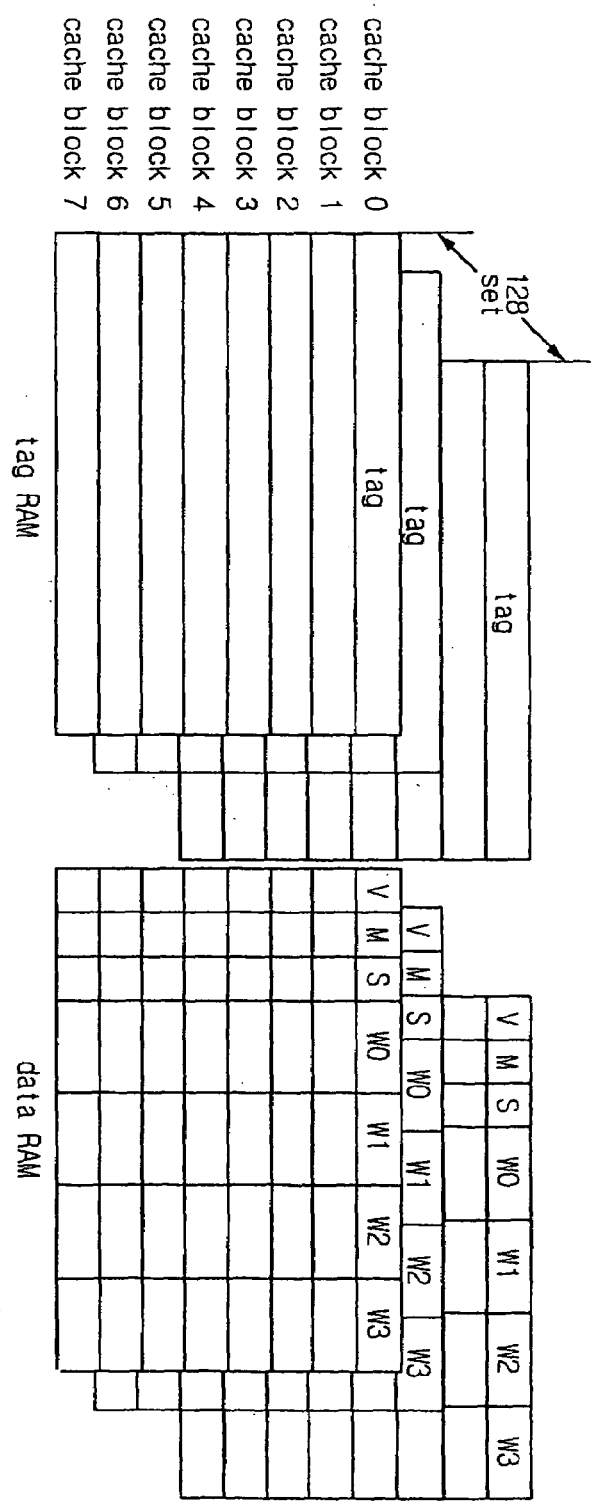
FIG. 2 illustrates an exemplary level 1 data cache memory structure.
Figure 3:
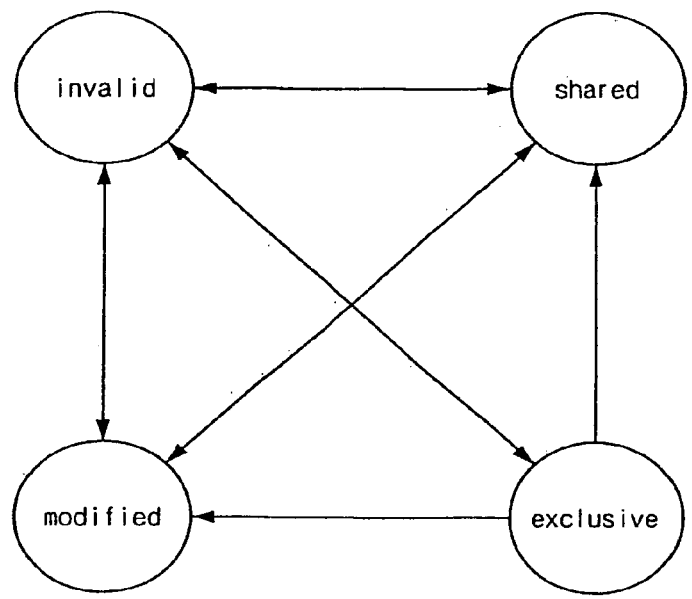
FIG. 3 illustrates a MESI protocol.
Figure 4:
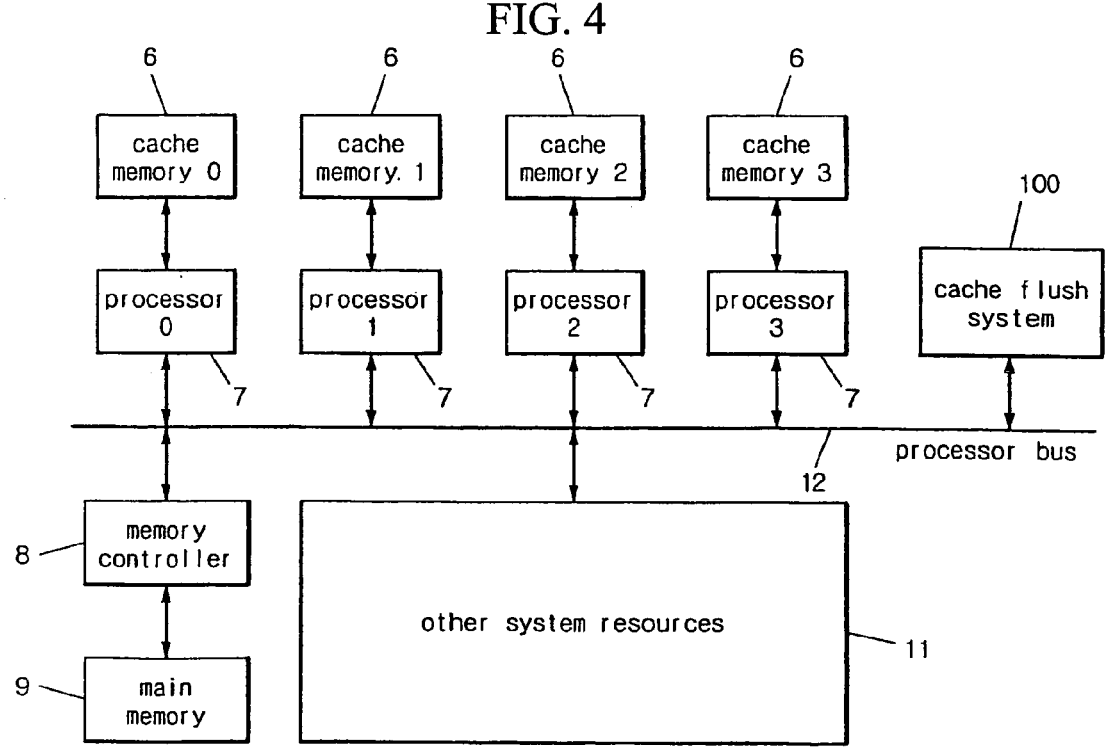
FIG. 4 illustrates an exemplary embodiment of a multi-processor system according to a preferred embodiment of the present invention.

FIG. 4 is a diagram that shows a multi-processor system according to one exemplary embodiment of the present invention. As shown in FIG. 4, a multi-processor system according to the present invention can include a copy back type cache memory 6 having a bus snoop mechanism and includes a plurality of processors 7 coupled to a processor bus 12, a memory controller 8 coupled to the processor bus 12, a main memory 9 under control of the memory controller 8, other system resources 11 coupled to the processor bus 12 and a cache flush system 100 coupled to the processor bus 12. FIG. 4 illustrates four processors 7 (e.g., processor 0~processor 3) and 4 cache memories 6 (e.g., cache memory 0~cache memory 3) according to the number of processors. However, the present invention is not intended to be so limited.

Figure 5:
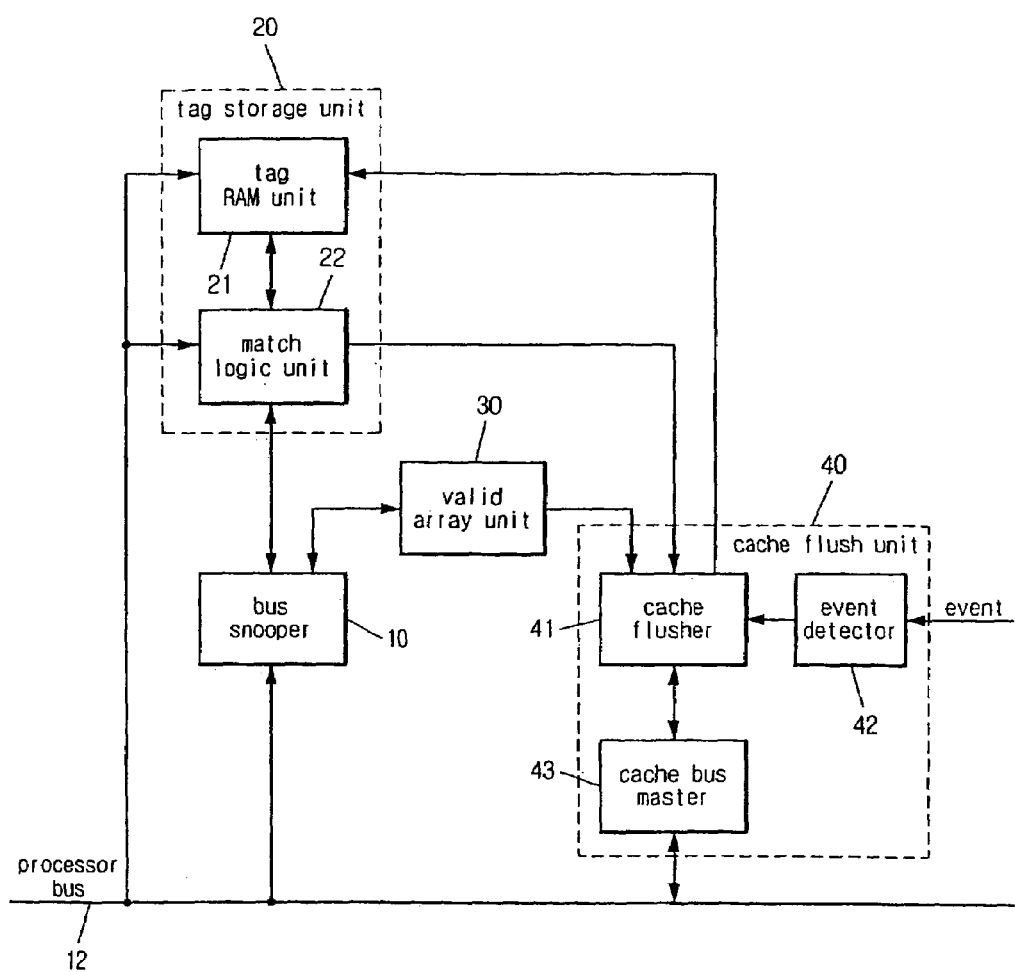
FIG. 5 illustrates an exemplary embodiment of a cache flush system in FIG. 4 according to a preferred embodiment of the present invention.

FIG. 5 is a diagram that shows an exemplary embodiment of the cache flush system 100. As shown in FIG. 5, the cache flush system 100 can perform cache flush algorithm against a certain or prescribed event and manage states of each cache memory 6 by tracing the states thereof The cache flush system 100 can include a valid array unit 30, a bus snooper 10, a tag storage unit 20 and a cache flush unit 40.

Figure 6A:
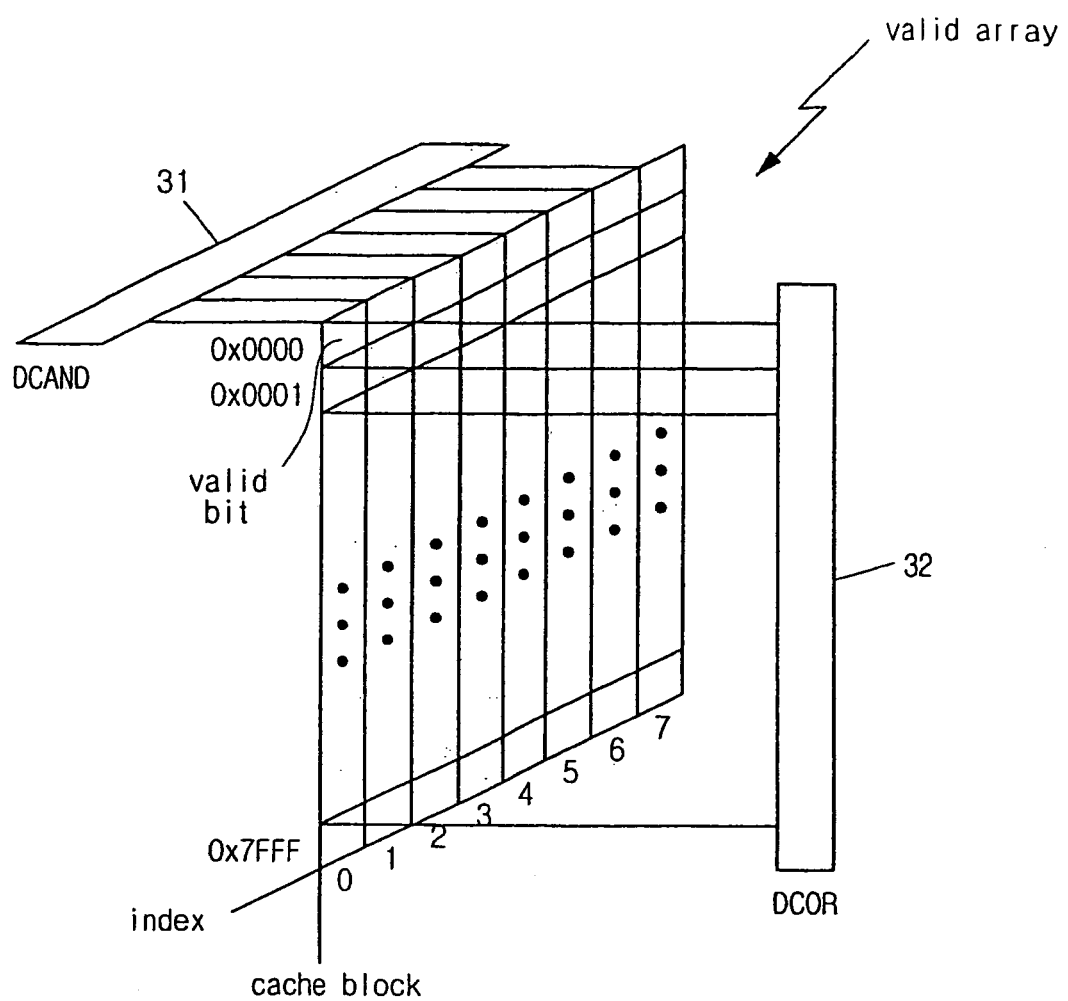
FIG. 6*a* illustrates an exemplary 3-dimensional structure of valid array unit in FIG. 5.
Figure 6B:
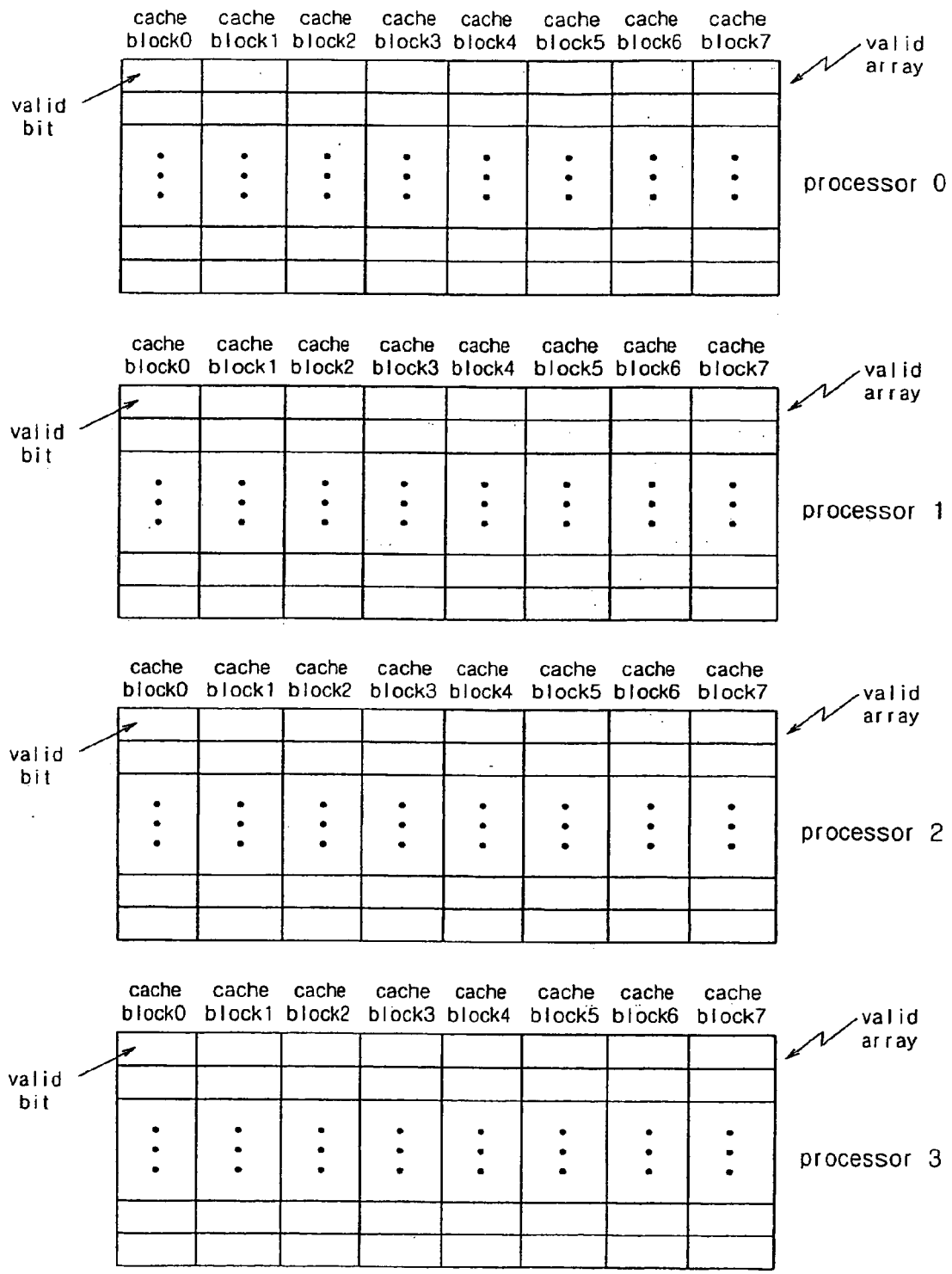
FIG. 6*b* illustrates an exemplary 2-dimensional structure of valid array unit in FIG. 5.

The valid array unit 30 will now be described. FIG. 6a is a diagram that illustrates 3-dimensional structure of the valid array unit in FIG. 5, and FIG. 6b is a diagram that illustrates 2-dimensional structure of the valid array unit in FIG. 5.

The valid array unit 30 can include a Divide & Conquer AND tree DCAND) 31 and a Divide & Conquer OR tree (DCOR) 32. The valid array unit 30 preferably provides the bus snooper 10 with cache block information for an update method or algorithm for a cache block in a valid state, (i.e., an exclusive state or a modified state) and provides the cache flush unit 40 with index information for a cache flush method or algorithm.

More specifically, the cache flush system 100 can perform cache flush for cache block in the exclusive state or modified state in cache memory 6 when a certain event (i.e., prescribed events) happens. The valid array unit 30 can be used to effectively manage the performance of the cache flush process.

The valid array unit 30 can include a valid array. The valid array is 3-dimensional array whose elements can be valid bits indicating whether corresponding cache block is in an exclusive state or a modified state, that is a valid state and one axis of the valid array is the processor 7. Thus, a 2-dimensional valid array can exist for each processor as illustrated in FIG. 6b. FIG. 6a illustrates an example of 3-dimensional structure of valid array for one processor 7. As shown in FIG. 6a, one rectangular object configured by the horizontal axis (e.g., index 0~index 7) and the vertical axis (e.g., 0x0000~0x7FFF), that is one valid array, indicates one processor 7. If the number of processors is 4, the number of corresponding rectangular object, that is valid array, should be 4. Further, FIG. 6b illustrates an example of 2-dimensional structure of valid array for four processors 7. Each processor 7 includes 8 cache blocks and each cache block includes a plurality of valid bits. However, the present invention is not intended to be so limited.

If valid bit is a first preset value, e.g., '1', the cache block is in a valid state, so that the cache block should be cleared. Thus, the cache flush process is performed. In contrast, if valid bit is a second preset value, e.g., '0', it means that the cache block is an invalid state, so that it does not need to clear the cache block. Thus, the cache flush process is not performed.

Figure 7:
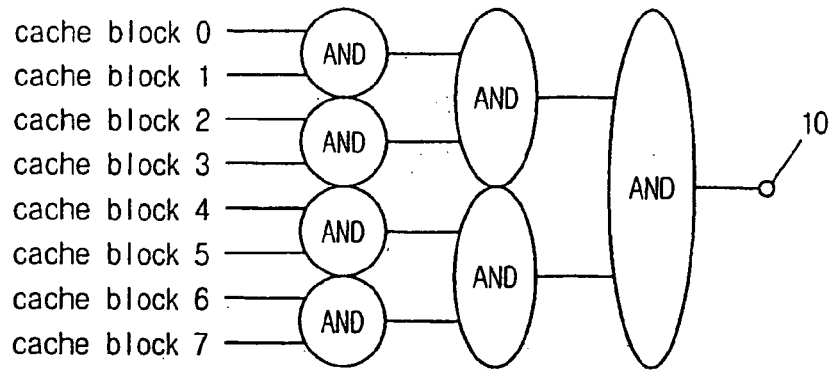
FIG. 7 illustrates an exemplary DCAND in FIG. 6*a*.
Figure 8:
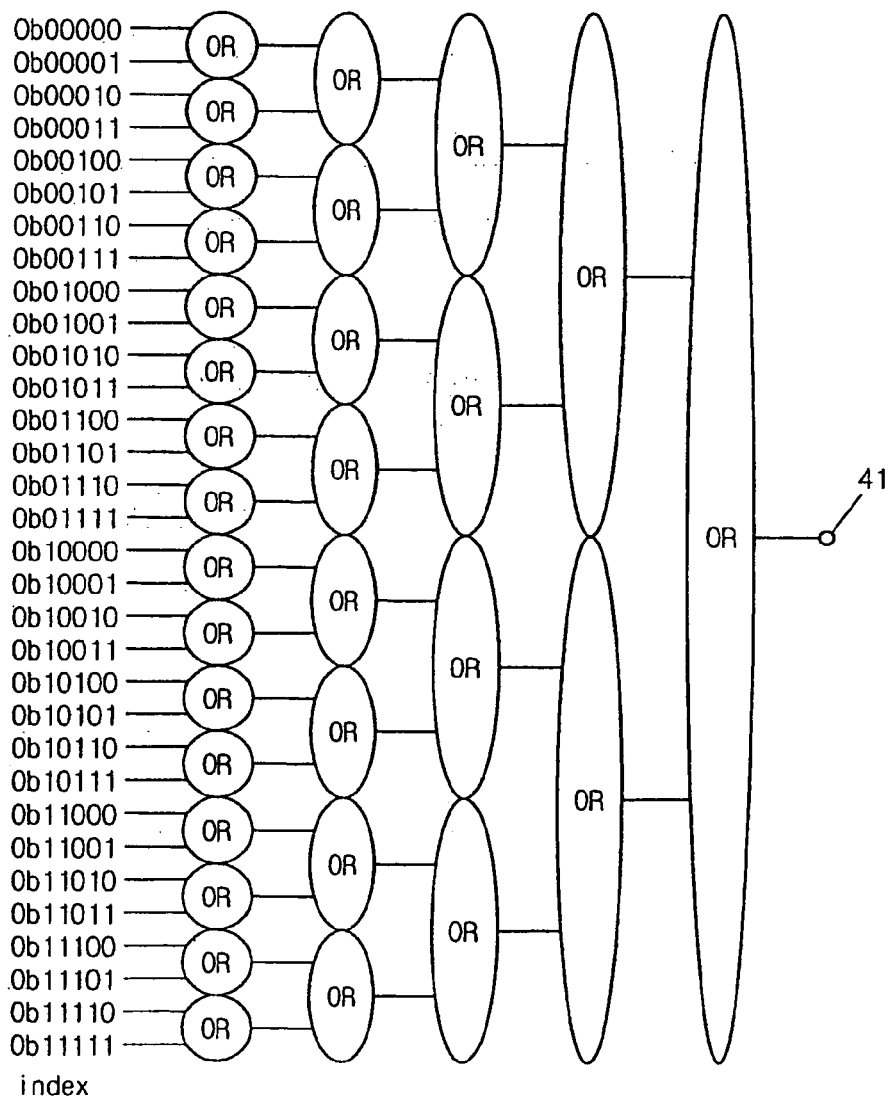
FIG. 8 illustrates an exemplary DCOR in FIG. 6*a*.

Further, the valid array unit 30 can implement logic trees, such as DCAND 31 and DCOR 32, in order to perform an update process and a cache flush process effectively. FIGS. 7 and 8 respectively illustrate an exemplary DCAND 31 and simplified DCOR 32 of a certain cache block of FIG. 6a. The DCAND 31 illustrated in FIG. 7 is directed to or about all valid bits for one cache set index and can provide the bus snooper 10 with cache block information. The DCOR 32 illustrated in FIG. 8 is an example of valid bit having a 5 bit index among 15 bits indexing one cache block and can provide the cache flusher 41 with index information.

Figure 9:
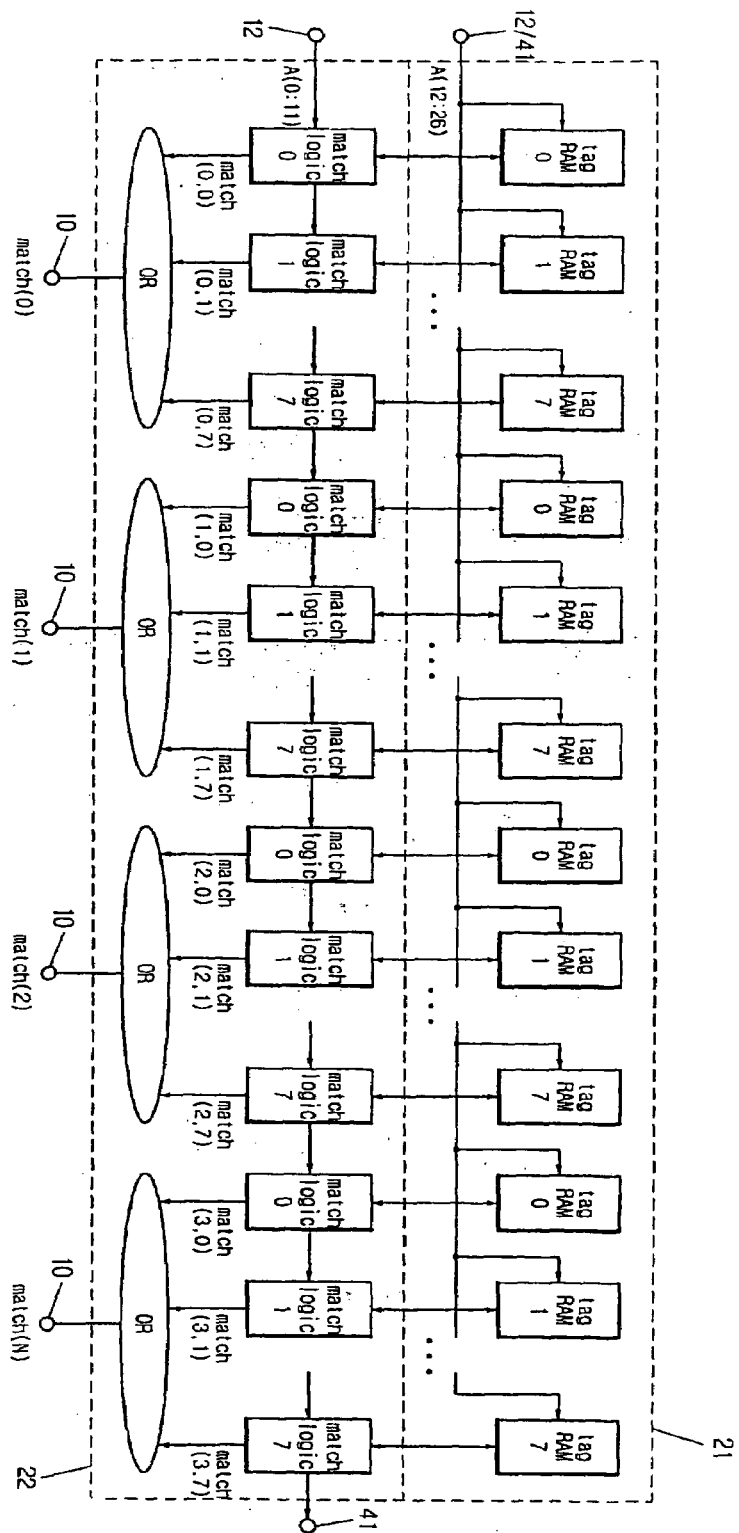
FIG. 9 illustrates an exemplary tag storage unit in FIG. 5.
Figure 10:
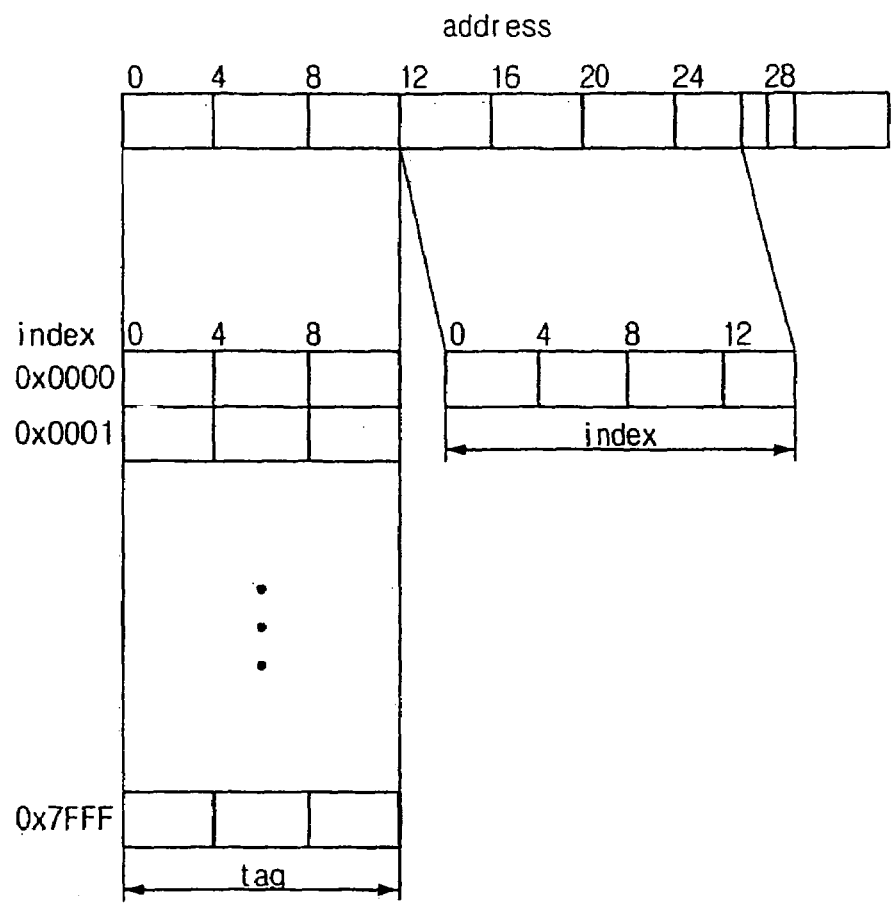
FIG. 10 illustrates an exemplary address mapping in FIG. 9.

FIG. 9 is a diagram that illustrates an exemplary tag storage unit of FIG. 5. FIG. 10 is a diagram that illustrates an exemplary address mapping of FIG. 9.

The tag storage unit 20 can include a tag RAM unit 21 and a match logic unit 22, and the tag storage unit 20 preferably stores tags and provides the bus snooper 10 with match address information for the update process and the cache flush unit 40 with tag information for the cache flush process. The tag RAM unit 21 can store a certain number of tags for a certain index and the match logic unit 22 can output the match address information by interfacing with the tag RAM unit 21 and provide the bus snooper 10 with whether processor bus address matches tag of the corresponding address index. The match logic unit can 22 output the tag information and provides the cache flush unit 40 with tag making up 'read' transaction address.

The tag RAM unit 21 included in the tag storage unit can 20 store a certain number of tags for index and a size of the index is inversely proportional to the number of tags as illustrated in FIG. 10. For an exemplary configuration of 32KB 8-way set-associative level 1 data cache memory and 1 MB direct level 2 cache memory, indexes are 15 bits and tags are 12 bits.

FIG. 9 illustrates an exemplary configuration of the tag storage unit 20. The tag RAM unit 21 can include 8 tag RAMs (e.g., tag RAM 0~tag RAM 7) for each processor 7. The match logic unit 22 can be directly coupled to the tag RAM unit 21 and include match logics (e.g., match logic 0~match logic 7) separately interfacing with each tag RAM. Thus, the match logic unit 22 can update contents of corresponding tag RAM and extract address for the cache flush process. Further, the match logic unit 22 preferably determines whether an address that matches each cache memory 6 among addresses where transaction is currently going on at processor bus 12 exists and notifies the bus snooper 10 of whether the address exists. Thus, updating tag RAM can be normally performed.

In other words, in FIG. 9, address A (12:26) among transaction addresses is inputted into tag RAM of the tag RAM unit 21 and address A (0:11) is inputted into match logic of the match logic unit 22. For example, match logic 0 outputs to match (0,0) whether to be matched with tag RAM 0, match logic 1 outputs to match (0,1) whether to be matched with tag RAM 1, . . . , and match logic 7 outputs to match (0,7) whether to be matched with tag RAM 7. Preferably, if '1' is outputted as a result of OR operating the match outputs, the match logic unit 22 notifies the bus snooper 10 that the address matches. Further, the tag RAM unit 21 receives index from the cache flush unit 40 and match logic unit 22 provides the cache flush unit 40 with tag information corresponding to the index.

The bus snooper 10 will now be explained. The bus snooper 10 can perform an update algorithm or method for the tag storage unit 20 and the valid array unit 30 by monitoring a corresponding processor bus (e.g., preferably while being directly coupled to the processor bus 12) and by tracing a state of each cache memory 6 by update algorithm or method. Thus, the bus snooper 10 can perform an update process for the tag storage unit 20 and the valid array unit 30. The bus snooper 10 helps precise update by performing placement algorithm or process using cache block information of the DCAND 31 when performing the update process for the tag RAM unit 21.

The cache flush unit 40 will now be described. The cache flush unit 40 can detect a certain event for system, generate a 'read' transaction that makes each processor 7 perform the cache flush process for cache blocks in a valid state by using its own cache flush process and output the 'read' transaction.

The cache flush unit 40 can include an event detector 42, a cache flusher 41 and a cache bus master 43. The event detector 42 preferably detects whether a certain event for system occurs and the cache flusher 41 generates a 'read' transaction according to the index information and the tag information to which a corresponding address is mapped by performing cache flush process. The cache bus master 43 can output the generated 'read' transaction to the processor bus 12 and transfer the 'read' transaction to each processor 7. Thus, cache flush process for the cache memory 6 may be performed.

The cache flusher 41 can extract the index by performing address arrangement algorithm or process (e.g., Address Arrangement Algorithm) using index information of the DCOR 32, obtains tag information from the match logic unit 22 by providing the tag RAM unit 21 with the index and maps the address by incorporating the index and the tag.

Figure 11:
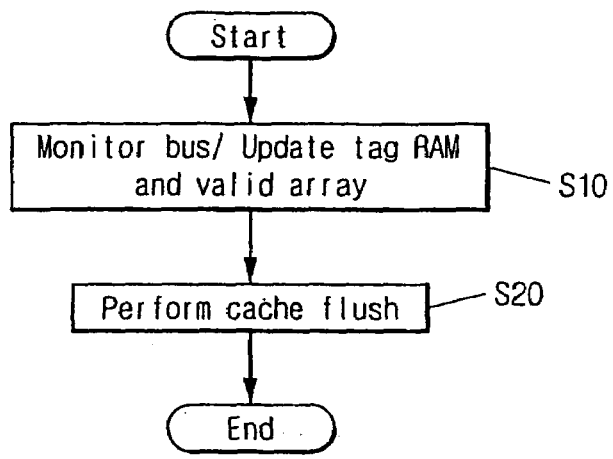
FIG. 11 illustrates an exemplary embodiment of a cache flush method according to another preferred embodiment of the present invention.

FIG. 11 illustrates an embodiment of a cache flush method according to the present invention. The embodiment of a cache flush method shown in FIG. 11 can be applied to and will be described using a system shown in FIG. 5. However, the present invention is not intended to be so limited.

As shown in FIG. 11, after a process starts, first, the bus snooper 10 performs update algorithm for tag RAMs of the tag storage unit 20 and valid arrays of the valid array unit 30 by monitoring a transaction of corresponding processor bus 12 while being directly connected to the processor bus 12 and by tracing a state of each cache memory 6 corresponding to each processor (block S10). Preferably, the bus snooper 10 is independently operating.

Further, the cache flush unit 40 performs a cache flush process for cache block(s) in a valid state in the cache memory 6 by detecting a certain event, generating 'read' transaction using the tag RAM and valid array and outputting the 'read' transaction (block S20). From block S20, the process can end.

Figure 12:
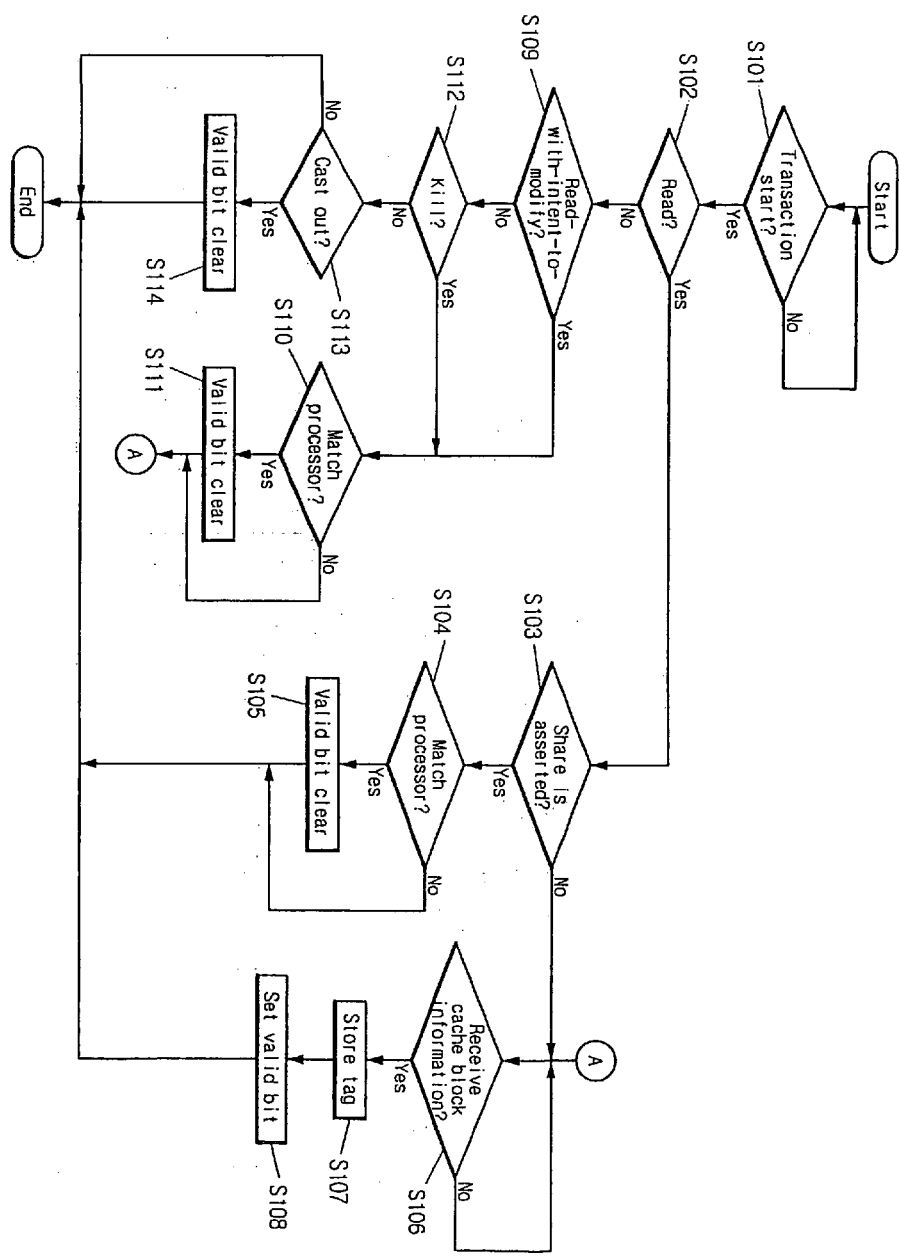
FIG. 12 illustrates an exemplary renewal procedure in FIG. 11.

FIG. 12 illustrates an exemplary updating procedure in FIG. 11. As shown in FIG. 12, after a process starts, the bus snooper 10 monitors in real time whether new transaction is started on the processor bus 12 (block S101).

In a case where new transaction is started as a result of the monitoring, the bus snooper 10 can determine whether an attribute of the transaction is 'read' by extracting the attribute of the transaction (block S102).

In a case where the attribute is 'read' after the determining, the bus snooper 10 can determine whether share is asserted from processors (for example, processor 1, processor 2 and processor 3) except for current transaction master processor 7 (for example, processor 0) (block S103).

In a case where share is asserted from the processors except for current transaction master processor as a result of the determining (block S103), whether a processor whose address matches the share assertion exists or not can be determined (block S104). In a case where such processor does not exist, the bus snooper 10 preferably stops its own operation. In contrast, in a case where such processor exists, the bus snooper 10 does not set a valid bit of the transaction master processor 7 from an invalid state (e.g., the valid bit=0) to a valid state (e.g., the valid bit=1) and clears a valid bit of the processor whose address is matched with the share assertion from a valid state into an invalid state (block S105). In other words, cache block existing in the cache memory 6 is in a shared state, so that it does not need to perform cache flush algorithm even though system event occurs.

On the other hand, as a result of the determining (block S103), in a case where share is not asserted, in other words, in a case where no processor caches the address, the valid array unit 30 selects cache block through placement algorithm preferably using DCAND 31 and provides the bus snooper 10 with cache block information. The bus snooper 10 preferably receives the cache block information by the placement algorithm (block S106), stores tags in the tag RAM unit of the tag storage unit 20 located in a designated position by index corresponding to the address in the selected cache block (block S107) and sets corresponding valid bit of the valid array unit 30 from an invalid state to a valid state (block S108). In other words, current transaction master processor 7 keeps corresponding data exclusively, so that it is needed to perform cache flush process when system event occurs.

Designation of the location for storing tags is preferably automatically performed by index corresponding to the address. In contrast, to select cache block to be used preferably depends on the DCAND 31. To select cache block using the DCAND 31 can be the placement process.

Figure 13:
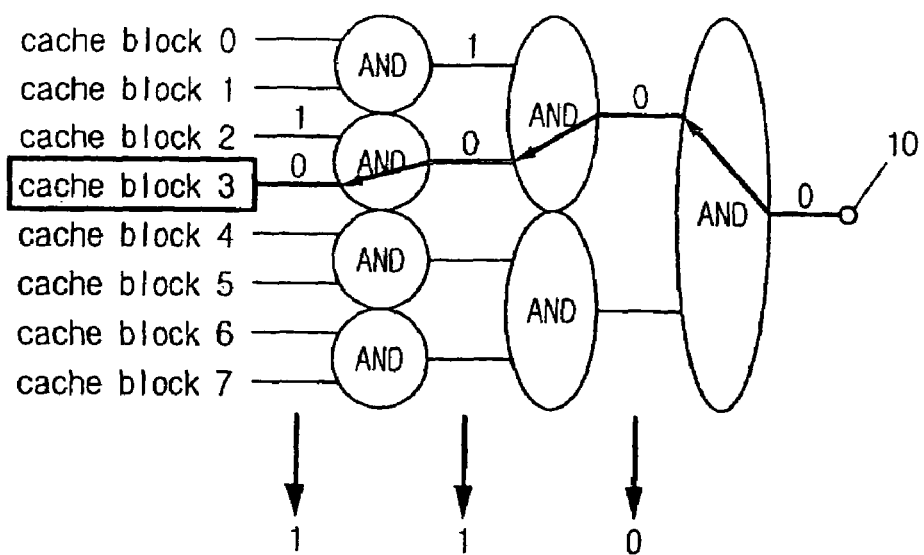
FIG. 13 illustrates an exemplary placement operation.

An exemplary placement algorithm will now be described with reference to FIG. 13. As shown in FIG. 13, an exemplary placement algorithm can use the DCAND in FIG. 7.

It is assumed in this specification that a direction towards cache block 0 is a lower direction and a direction towards cache block 7 is a higher direction. At each determining step, in a case where a lower direction is selected, it means '0'. In contrast, in a case where a higher direction is selected, it means '1'. However, the present invention is not intended to be so limited. The placement algorithm is to trace a lower direction cache block under a condition that an each step output of the DCAND 31 is '0' illustrating that empty cache block exists in a corresponding branch. Accordingly, as illustrated in FIG. 13, a lower direction is '0' at a first AND determining step from a right end, so that it means '0' according to the lower direction selection. A higher direction is '0' at a second AND determining step from a right end, so that it means '1' according to the higher direction selection. A higher direction is '0' at a third AND determining step from a right end, so that it means '1' according to the higher direction selection. Finally, cache block 3 corresponding to '011' is selected.

On the other hand, in a case where the attribute is not a 'read' as a result of the determining (block S102), the bus snooper 10 can determine whether the attribute is 'read-with-intent-to-modify' (block S109). In a case where the attribute is a 'read-with-intent-to-modify' as a result of the determining (block S109), it can be determined whether a processor whose address matches the 'read-with-intent-to-modify' exists (block S110). In a case where the processor exists, the bus snooper 10 clears a valid bit of the matched processor having a tag for the address from a valid state into an invalid state (block Sill). In other words, current transaction master processor 7 has an intention to change after caching the data, so that it becomes a changing state. Then, other processors make a cache state for the data invalid and the bus snooper 10 performs update algorithm, thus clears a valid bit of each processor whose address matches.

Preferably, the bus snooper 10 can further perform for the transaction master processor 7 the receiving cache block information block S106, the storing tags block S107 and the setting valid bits block S108. In other words, the bus snooper 10 updates tag RAM of the tag storage unit 20 and valid array of the valid array unit 30 for the processor by using the placement algorithm. Further, as a result of the determining (block S110), even in a case where the matched processor does not exist, the bus snooper 10 performs for the transaction master processor 7 the receiving cache block information block S106, the storing tags block S107 and the setting valid bits block S108.

On the other hand, in a case where the attribute is not 'read-with-intent-to-modify' as a result of the determining (block S109), the bus snooper 10 can determine whether the attribute is a 'kill' transaction (block S112). At this time, in a case where the attribute is 'kill' transaction as a result of the determining (block S112), the bus snooper 10 determines whether a processor whose address matches the 'read-with-intent-to-modify' exists (block S110) and performs the clearing valid bits (block S100), the receiving cache blocks (block S106), said storing tags (block S107) and the setting valid bits as performed in a case where the attribute is the 'read-with-intent-to-modify'. In other words, the 'kill' transaction means that a current bus master processor 7 that will be able to be a transaction master processor intents to change cache data in a shared state and a state of cache memory 6 of the bus master processor 7 is shifted from the shared state into the modified state. Accordingly, the bus snooper in a case where the attribute is 'kill' transaction can perform the same operations as operations in a case where the attribute is 'read-with-intent-to-modify'.

In contrast, in a case where the attribute is not 'kill' transaction as a result of the determining (block S112), the bus snooper 10 determines whether snoop push is performed by being cast out through replacement operation of cache controller (block S113). In a case where snoop push is not performed by not being cast out as a result of the determining (block S113), the bus snooper can end its operation. In contrast, in a case where snoop push is performed by being cast out as a result of the determining (block S113), the bus snooper 10 preferably clears a valid bit of the matched processor having a tag for the address from a valid state into an invalid state (block S114).

In other words, the snoop push is preferably performed in three cases. A first one is a case that snoop hit is performed by 'read' of other bus master processor 7, a state of cache memory 6 is shifted to a shared state. A second one is a case that snoop hit is performed by 'write' or 'read-with-intent-to-modify' of other master processor 7, a state of cache memory 6 is shifted to an invalid state. The third one is a case that cast out is performed by replacement operation of the cache controller, a state of cache memory 6 is shifted to an invalid state. Accordingly, for all the cases that snoop push is performed, it is no need to perform cache flush algorithm for a corresponding address when system event occurs, so that the bus snooper 10 clears a corresponding valid bit.

By the above-described embodiment of update algorithm or process of the bus snooper 10, it is made possible to precisely manage each of the processors' cache memory state, in order for the cache flush unit 40 to properly perform cache flush algorithm when system event occurs.

Figure 14:
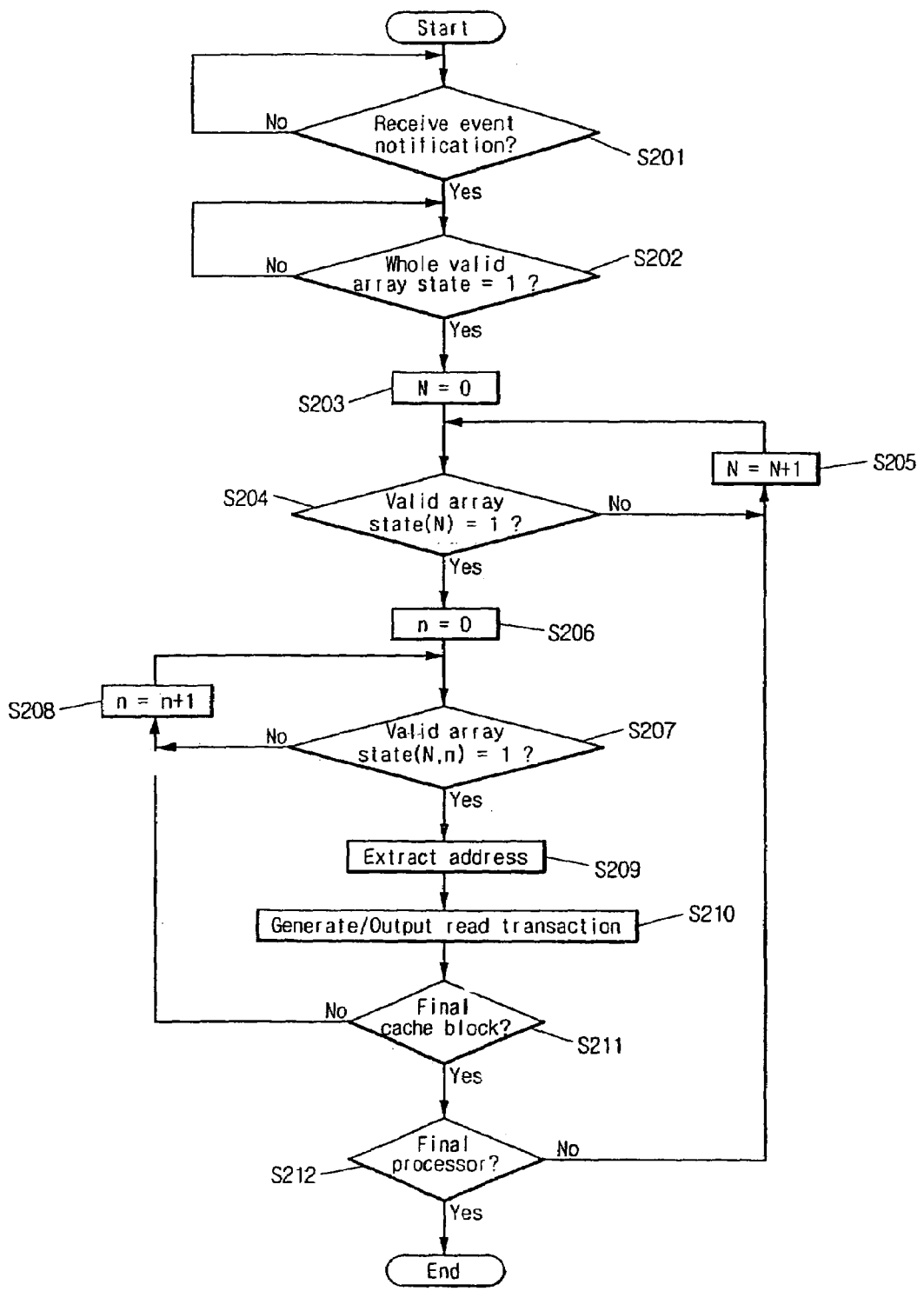
FIG. 14 illustrates an exemplary cache flush procedure in FIG. 11.

The cache flush (block S20) will now be described. FIG. 14 is a flow diagram illustrating an exemplary cache flush procedure in FIG. 11. FIG. 14 illustrates cache block in a valid state of processor 7 in response to an event occurrence. For example, by looking for a processor in a valid state among processor 0~processor 3 illustrated in FIG. 6b and cache block in a valid state of the identified or selected processor, a corresponding address can be extracted and transaction can be generated/outputted to perform a cache flush process.

As shown in FIG. 14, after a process starts an event detector 42 of the cache flush unit 40 notifies in real time a cache flusher 41 of whether a system event pre-designated to perform cache flush algorithm occurs. The cache flusher 41 receives notification about whether such an event occurs from the event detector 42 (block S201).

The cache flusher 41 can check whether valid array state of all processors is valid (e.g., whole valid array state =1) by OR operating all valid bits of valid array for all the processors 7 (block S202). In a case where valid array state of all processors is valid as a result of the checking, the cache flusher 41 performs cache flush algorithm for cache memory 6 of each processor 7 from processor 0 to processor 3. The valid array state of all processors is obtained by OR operating all valid bits for valid array of all processors. In other words, if at least one valid bit is '1', that is, if at least one valid bit is in a valid state, valid array state of all processors is valid.

Particularly, the cache flusher 41 can determine whether valid array state of a first processor N (N=0) is valid (e.g., valid array state (N)=1) (block S204). The valid array state (N) can be obtained by OR operating final output of DCOR 32 collected according to each cache block.

In a case where valid array state of the processor is not valid as a result of the determining, that is, in a case where valid array state of the processor is invalid (e.g., valid array state (N)=0), the cache flusher 41 performs determination of a processor valid array state for a next processor N (N=N+1) (block S205). In contrast, in a case where the valid array state is valid (e.g., valid array state (N)=1) as a result of the determining (block S204), the cache flusher 41 can determine whether valid array state for a first cache block n (n=0) of the processor is valid (e.g., valid array state (N, n)=1) (block S207). Whether valid array state for a first cache block of the processor is valid can be determined by checking final output of DCOR 32 collected according to each cache block.

In a case where valid array state of the cache block is not valid as a result of the determining (block S207), that is, the valid array state is invalid (e.g., valid array state (N,n)=0), the cache flusher 41 performs the determining cache block valid array state (block S207) for a next cache block n (n+n+1) (block S208). In contrast, in a case where valid array state of the cache block is valid (e.g., valid array state (N, n)=1) as a result of the determining (block S207), the cache flusher 41 makes value extracted by address arrangement algorithm an index, receives tag information corresponding to the index from match logic unit 22 of a corresponding tag storage unit 20 by providing tag RAM unit 21 of the tag storage unit 20 with the index and extracts a corresponding cache block address designated by mapping a corresponding index and tags (block S209). The extracting the cache block address is performed by extracting address corresponding to valid bit in a valid state among valid array of a corresponding cache block.

The cache flusher 41 can generate a 'read' transaction for cache block corresponding to the extracted cache block address and output the 'read' transaction through the cache bus master 43 to processor bus 12. Thus, a processor 7, corresponding to a cache memory to which a corresponding cache block belongs, performs cache flush process for cache block of the corresponding cache memory 6 (block S210). Generation of a 'read' transaction for the cache block is particularly performed by generating a 'read' transaction corresponding to extracted address for a valid bit in a valid state among valid array of the cache block.

Figure 15:
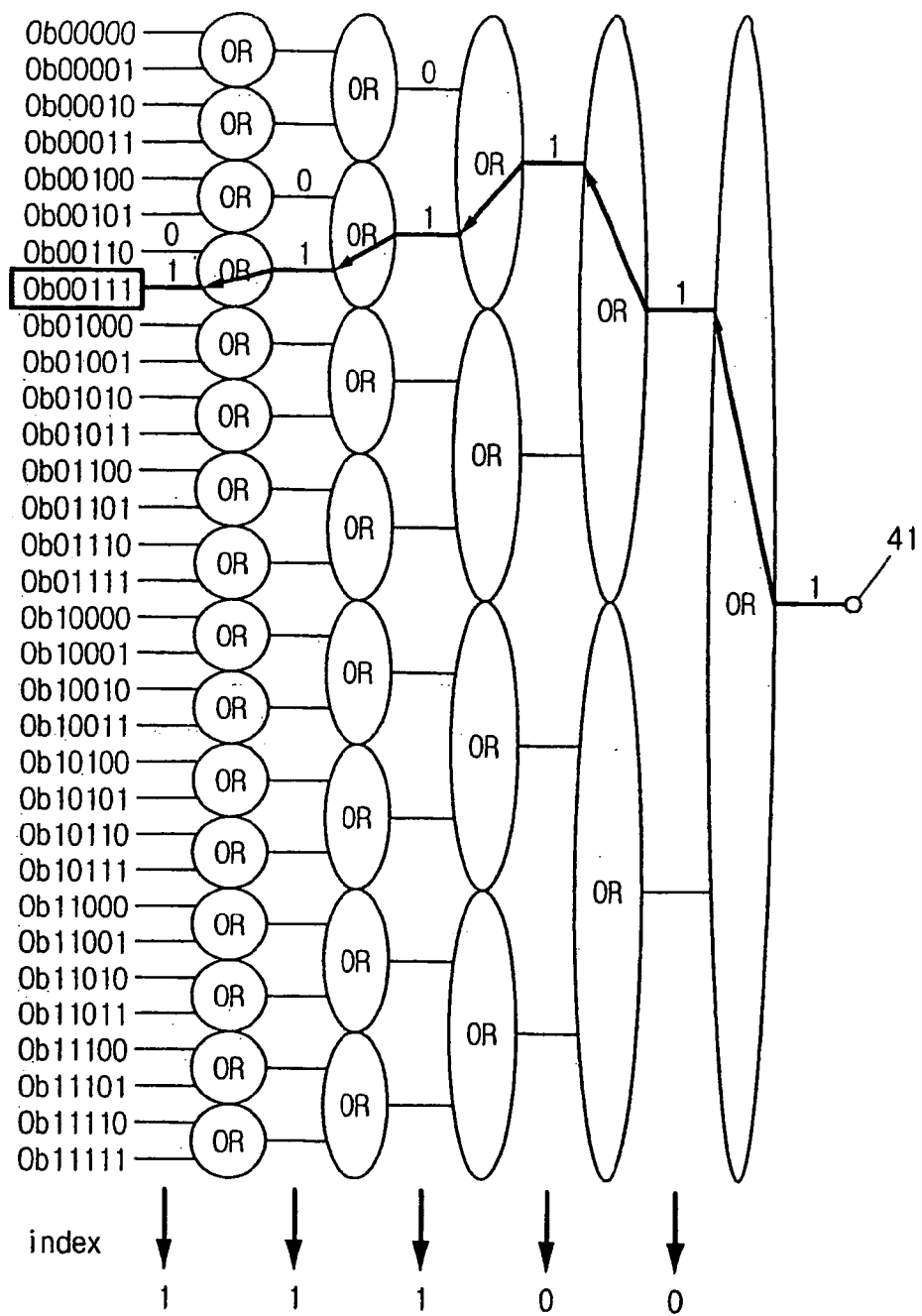
FIG. 15 illustrates an exemplary address arrangement operation.

The address arrangement algorithm can be implemented by using DCOR 32. An exemplary address arrangement algorithm will be now described. FIG. 15 illustrates an exemplary address arrangement algorithm using DCOR illustrated in FIG. 8.

It is assumed in this specification that a direction towards an index '0b00000' is a lower direction and a direction towards an index '0b11111' is a higher direction. At each determination, in a case where a lower direction is selected, it means '0'. In contrast, in a case where a higher direction is selected, it means '1'. The address arrangement algorithm can trace a lower direction index under a condition that an each determination output of the DCOR 32 is '1' illustrating that occupied cache block exists in a corresponding branch. Accordingly, as illustrated in FIG. 15, a lower direction is '1' at a first OR determination from a right end, so that it means '0' according to the lower direction selection. A lower direction is '1' at a second OR determination from a right end, so that it means '0' according to the lower direction selection. A higher direction is '1' at a third, a fourth and a fifth OR determination from a right end, so that it means '1' according to the higher direction selection. Finally, it means '00111', so that an index '0b00111' is selected.

Then, the cache flusher 41 can determine whether the cache flushed cache block is a final cache block among cache blocks that belong to cache memory 6 corresponding to the processor 7, which is an object of the 'read' transaction (block S211). A final cache block in this case means a 8th cache block (M,N)=(M,7), At this time, $0 \leq M \leq 3$) when the number of processors 7 that is an object of the 'read' transaction is 4 and the number of cache blocks that belongs to cache memory 6 corresponding to each processor is 8. However, the present invention is not intended to be so limited.

In a case where the cache block is not a final cache block as a result of the determining (block S211), the cache flusher 41 performs the determining a valid array state (block S207) of a next cache block (block S208). In contrast, in a case where the cache block is a final cache block as a result of the determining (block S211), the cache flusher 41 can determine whether the processor which is an object of the 'read' transaction is a final processor among all processors (block S212). The final processor can mean a fourth processor (e.g., (M,N)=(3,N), at the same time, N is 7). In a case where the processor is not a final processor as a result of the determining (block S212), the cache flusher 41 can perform said determining valid state of a next processor (block S205). In contrast, in a case where the processor is the final processor as a result of the determining (block S212), the cache flusher 41 can end cache flush process.

As described above, the cache flusher 41 can repeat a process or the same algorithm from a beginning if cache flush process is completed in all cache blocks of each processor 7. The repetition preferably continues until each processor 7 makes a corresponding cache memory 6 disable. Each of the processor 7 can make a corresponding cache memory 6 disable on the basis of valid bit for each of the processor 7.

As described above, embodiments of a cache flush system and methods thereof according to the present invention have various advantages. Embodiments of the present invention can reduce or minimize loads of a processor bus, for example, by performing memory read at most as much as the size of level 2 cache memory of each processor. Further, embodiments can increase or assure simultaneousness of a cache flush for a certain event by performing cache directly triggered by the certain event. Thus, a high speed cache flush process can be performed. Further, a cache flush process can be automatically generated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cache flush system, comprising:
   a valid array unit configured to provide cache block information for an update algorithm and index information for a cache flush algorithm of at least one cache block in a prescribed state;
   a storage unit configured to store tags and provide match address information for the update algorithm and tag information for the cache flush algorithm;
   a bus snooper configured to perform the update algorithm for the tag storage unit and the valid array unit by monitoring a processor bus and by tracing a state of each cache memory; and
   a cache flush unit configured to detect a system event, to perform the cache flush algorithm for corresponding cache blocks in the prescribed state, wherein the bus snooper performs the update algorithm by operating a placement algorithm using cache block information from a prescribed logic operation which includes a divide and conquer tree.

2. The system of claim 1, wherein the storage unit comprises: a tag RAM unit configured to store a plurality of tags for a prescribed index; and a match logic unit coupled to the tag RAM unit configured to provide whether processor bus address matches a tag of corresponding address index by outputting the match address information, and wherein the match logic unit is configured to provide a tag that will make up address for a read transaction by outputting the tag information.

3. The system of claim 1, wherein the divide and conquer tree is a divide and conquer AND tree (DCAND), wherein the placement algorithm traces a lower direction cache block under a condition that each output of the DCAND is '0' illustrating that empty cache block exists in a corresponding branch.

4. The system of claim 1, wherein the cache flush unit comprises:

an event detector configured to detect whether the system event occurs;

a cache flusher configured to generate a read transaction for a corresponding cache block according to the index information and the tag information to which a corresponding address is mapped, by performing the cache flush algorithm; and a cache bus master configured to perform the cache flush algorithm for the cache memory by transferring the read transaction to each processor through outputting the generated read transaction to the processor bus.

5. The system of claim 4, wherein the cache flusher extracts a corresponding index by performing an address arrangement using index information from a prescribed logic operation, obtains the tag information from a match logic unit of the storage unit providing the index and maps the address by incorporating the index and the tag.

6. The system of claim 5, wherein the divide and conquer tree is a divide and conquer OR tree (DCOR), wherein the address arrangement traces a lower direction index under a condition that each output of the DCOR is '1' illustrating that occupied cache block exists in a corresponding branch.

7. The system of claim 1, wherein the prescribed state is a valid state including a modified state and an exclusive state, and wherein the cache flush unit generates a read transaction to perform the cache flush algorithm for the cache block in the valid state and outputs the read transaction to the processor bus.

* * * * *